United States Patent [19]
Mullin et al.

[11] Patent Number: 5,904,177
[45] Date of Patent: May 18, 1999

[54] FLUID FLOW CONTROL DEVICE

[75] Inventors: Michael Maxwell Mullin, Oak Ridge; Peter Anthony Tartaglia, Butler; Brian Louis Magnone, Landing; Stephen Donald Bruneau, Edgewater Park, all of N.J.

[73] Assignee: Marotta Scientific Controls, Inc., Montville, N.J.

[21] Appl. No.: 08/819,242

[22] Filed: Mar. 17, 1997

[51] Int. Cl.$^6$ ................................................ F16K 31/12
[52] U.S. Cl. .......................................... 137/503; 137/501
[58] Field of Search ................................... 137/503, 501

[56] References Cited

U.S. PATENT DOCUMENTS

| | | | |
|---|---|---|---|
| 1,050,763 | 1/1913 | Cooper | 137/503 |
| 1,065,973 | 7/1913 | Shaffner | 137/503 |
| 2,633,147 | 3/1953 | Badami | 137/503 |
| 3,138,174 | 6/1964 | Gilpin | 137/503 |
| 3,189,125 | 6/1965 | Windsor et al. | 138/43 |
| 3,584,540 | 6/1971 | Petersen et al. | 137/503 |
| 3,633,868 | 1/1972 | Catania | 251/30 |
| 3,663,071 | 5/1972 | Kates | 308/5 |
| 3,742,970 | 7/1973 | Gross | 137/503 |
| 3,850,195 | 11/1974 | Olsson | 137/503 |
| 3,881,508 | 5/1975 | Smith | 137/503 |
| 3,958,603 | 5/1976 | Bannon et al. | 138/48 |
| 4,074,693 | 2/1978 | Kates | 137/454.6 |
| 4,791,956 | 12/1988 | Kominami et al. | 137/503 |
| 4,921,014 | 5/1990 | Tartaglia et al. | 137/625.3 |
| 4,986,312 | 1/1991 | Gute | 138/45 |
| 5,020,571 | 6/1991 | Tartaglia et al. | 137/625.3 |
| 5,027,861 | 7/1991 | Gute | 138/45 |
| 5,174,339 | 12/1992 | Pickard | 137/503 |
| 5,409,042 | 4/1995 | Kirchner | 138/42 |

FOREIGN PATENT DOCUMENTS

| | | | |
|---|---|---|---|
| 2317042 | 4/1973 | Germany | 137/503 |
| 2807542 | 8/1979 | Germany | 137/503 |
| 603812 | 6/1948 | United Kingdom | 137/503 |
| 1344465 | 1/1974 | United Kingdom | 137/503 |

OTHER PUBLICATIONS

Price List—Hays Fluid Controls—Apr., 1995.
Specification Sheets—W.A. Kates Company—Jun., 1995.

*Primary Examiner*—Denise L. Ferensic
*Assistant Examiner*—Joanne Y. Kim
*Attorney, Agent, or Firm*—Hopgood, Calimafde, Kalil & Judlowe

[57] ABSTRACT

A system for controlling fluid flow to an approximate constant rate is disclosed. The system includes a housing, a flow control element, a cutout formed in the flow control element, a valve element, and a spring. The housing has an inlet opening and an outlet opening. The ends are arranged and configured to receive piping. The flow control element is operatively positioned within the housing with the flow control element having an upstream end and a downstream end with a cutout formed therein. The fluid flows in the inlet and through the cutout into a larger chamber within the housing before exiting the outlet end of the housing in normal flow. A valve element is disposed within the housing adjacent and upstream of the flow control element. The valve element is positioned within the housing by a spring means which urges the valve element toward the outlet. The valve element is operatively connected to a plunger member and moves relative to the flow control element according to the pressure differential between the inlet and the outlet. The flow rate is controlled through the system by the relative position of the valve element and the cutout in the flow control element. A method for controlling fluid flow is also disclosed.

42 Claims, 11 Drawing Sheets

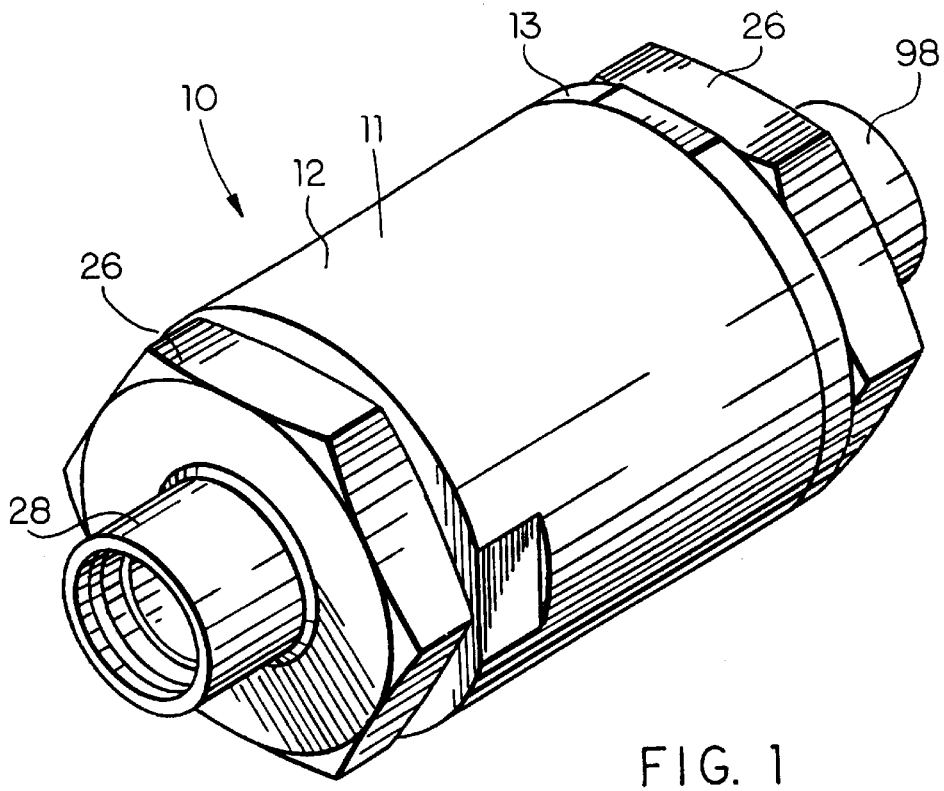
FIG. 1
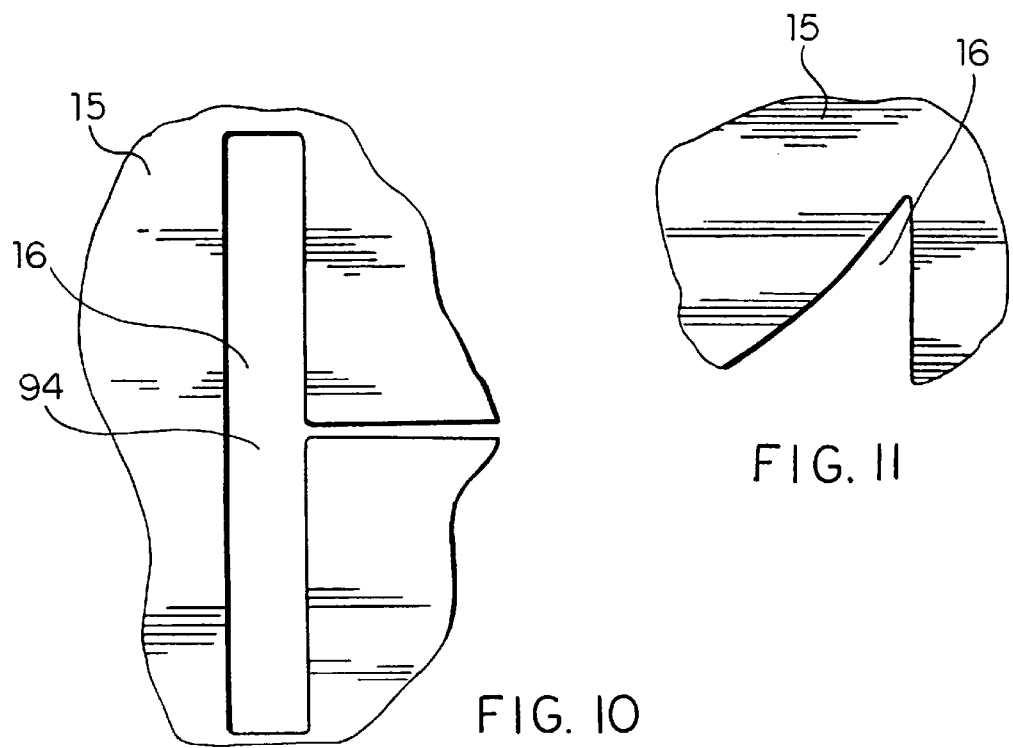
FIG. 10
FIG. 11

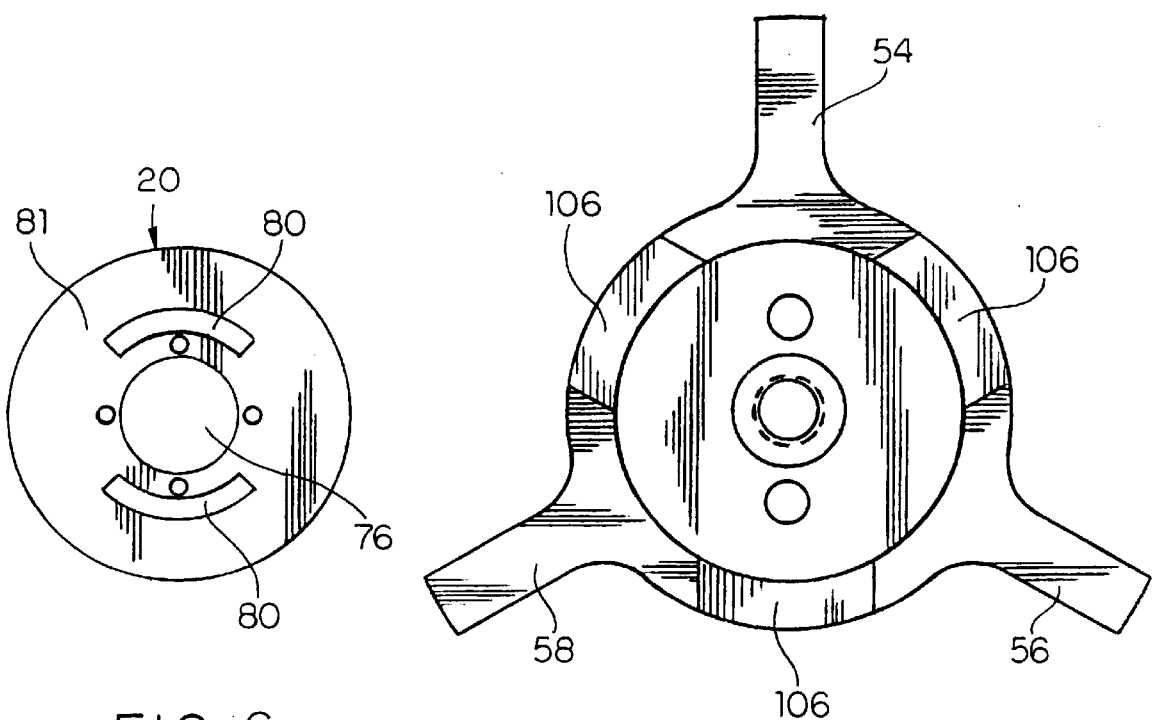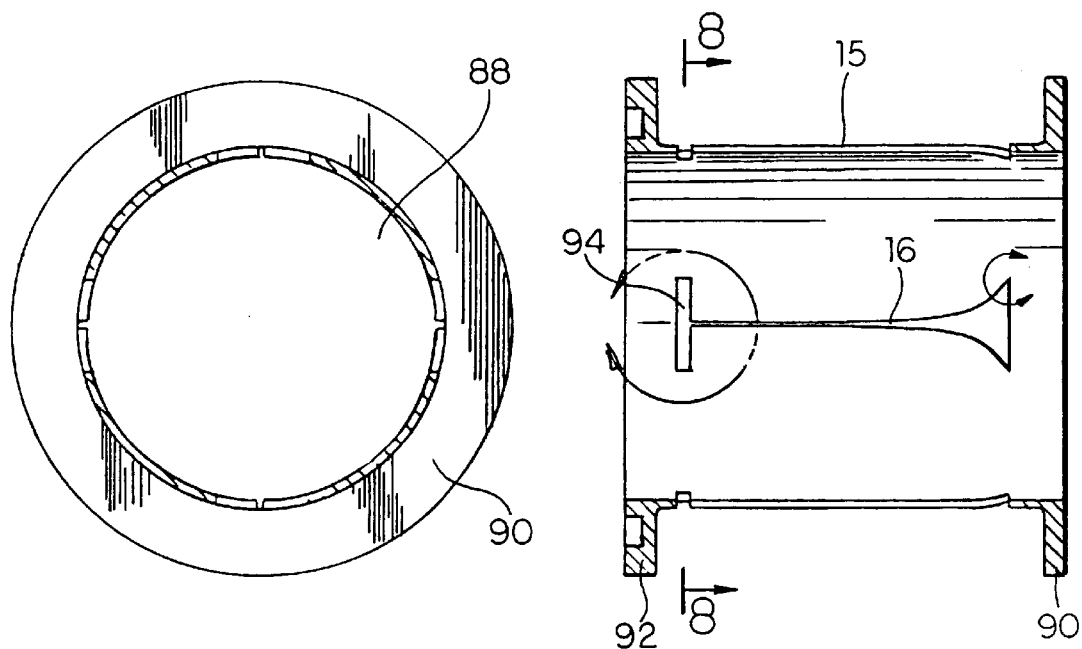

FLUID FLOW CONTROL DEVICE

BACKGROUND OF THE INVENTION

The present invention relates generally to fluid control systems that redirect or vary fluid flow or contain flow regulating devices, or particularly to fluid flow control systems including fluid flow regulating devices for maintaining a constant flow within a specified range of accuracy with varying pressure differentials, and more particularly to fluid flow regulating devices that provide accurate or precise flow control over a specified range of pressure differentials, producing little if any air borne or structure borne noise during operation of the fluid system throughout its range of control.

Fluid flow regulating devices are currently used in a variety of fluid control applications for industrial, military, or commercial requirements. Specifically, cooling water flow control systems are used to maintain a pre-determined flow rate to assure efficient heat transfer and maintain safe temperature operating range. The same basic concept is used as a temperature control wherever either an ambient temperature or heat generated from power consumption must be controlled. The use of flow control in hydraulic systems permits accurate positioning, control or rate, or precision retraction or extension under conditions that may have varying load. Examples of this type of fluid flow control are found in power lines in service vehicles, hydraulic lifting systems, and steel/roll mills.

The invention can also be utilized in medical applications to accurately or precisely control flow for cooling including oxygen, breathing systems, dialysis, heart and angioplasty machines. The flow control may be either liquid or gas. A typical application would include a cooling of the helium gas used to expand and/or contract "the balloon" inserted into a blocked arterial area.

Both pressure and flow control devices can generate noise that can be carried from the point of generation through some distance by either the system structure, its mounting or the structure surrounded and attached to the pressure or flow control system. This generated noise can be detected at a distance whether the atmosphere is a gas or a liquid. The noise generated can be the result of cavitation, impingement, turbulence, or entrained gases in liquid. A typical example of gas entrained in liquid as a noise generation in a pressure/flow system is the air hammering caused in hot water heat systems or steel pipes. The air entrained in the water results in flow variations. A similar condition occurs in liquids that are allowed to flow at sufficiently high velocities resulting in a high pressure drop in areas where the fluid conduit or pipe becomes restricted or changes direction. The pressure drop causes the fluid in these areas to change from a liquid to a gas. When the fluid containing entrained gas bubbles travels to a point where the system's pressure returns to a high pressure the entrained gas bubbles or voids collapse. The collapse generates noise and can result in the deterioration of the containment located at this vicinity (cavitation). The noise level generated into the fluid system can cause discomfort, annoyance, or harm to local inhabitancies. Public utilities are concerned with eliminating the noise generated capacity of fluid systems in gas transportation lines and other fluid flow systems. The control of an acceptable noise level depends on whether the noise is being transported or carried at a structure or is being detected or carried in a liquid or gas. Air borne noise can be controlled or diverted by unique structure designs. Minimizing the noise generated depends upon the flow rate, pressures, and system design. The level of noise reduction and the selection of the components of the system will determine the envelope or achievable noise level reduction with specific frequencies.

A typical flow control device is an elastomeric flow restrictor. The flow restrictor deforms into a plastic flow element as a pressure differential increases across the restrictor. In these devices as the pressure differential increases so does the deformation of the flow restriction and/or element cutouts. These devices are limited in use to a narrow pre-determined set of pressures and flow rates. The use of these devices creates high velocities, turbulence, and can result in cavitation. Similarly, if the fluid contains particulate matter either intentional such as a catalytic process, or contains dirt or other contaminants, the high velocities will result in impingement damage. All of these conditions are known to be sources of noise generation in fluid (liquid or gas) control systems using flow control or pressure control devices.

For specific shipboard applications, flow regulator valves similar to those described above are typically used to balance the flow rate of water to and from heating and cooling coils when several coils are supplied from one pump incorporating many branches in the flow circuit. For this reason, the flow regulator valves are typically called balancing valves because they balance the flow rate of water to each coil, although they are often used to balance flow control rates for other applications. The valves are most often used to control the flow rates of fluids with viscosities similar to that of water to fixed flow rates with variations in pressure drop across the valves. Without a flow regulation valve, as the pressure drop across a fixed orifice is increased, the flow rate is increased accordingly.

One specific type of prior flow regulator device employed a resilient diaphragm, as in U.S. Pat. No. 3,189,125. In operation, the resilient diaphragm is forced against a contoured orifice as the fluid pressure drop increases across the valve. Increasing pressure drop across the valve will progressively press the resilient diaphragm against a contoured orifice, causing the flow area between the resilient diaphragm and the contour to be reduced. The reduction in flow area is sufficient to restrict the flow to a more-or-less constant value even though the pressure drop across the flow area has increased (see FIG. 14 of the '125 patent). Many of these existing balancing valves utilize ribs that are molded onto the resilient diaphragm to keep the resilient diaphragm concentrically centered in the flow path immediately upstream of the contoured orifice. See, e.g., U.S. Pat. Nos. 5,409,042; 5,027,861; 4,986,312; 3,189,125 and 3,958,603. In these patents, the fluid first flows around the front of the resilient diaphragm, then through the annular section between the walls of the flow passage and the resilient diaphragm. Next, the fluid is diverted into the flow section between the resilient diaphragm and the contoured orifice (the variable flow area section) then exits out the back of the contoured orifice. Fluid flow through these devices is converging rather than diverging.

Thus, there is a need for new and improved fluid flow control systems including new and improved fluid flow regulating/control devices that maintain a constant flow rate therethrough within a range of pressure differentials. Such fluid flow regulating/control devices for maintaining a constant flow rate should: (1) overcome the aforementioned problems; (2) accurately control the fluid flow rate over a wide range of differential pressures; (3) produce little, if any, air borne or structure borne noise during operation; (4) have as few parts as possible and (5) significantly reduce, if not eliminate, the tendency for the flow control element from becoming dislodged; (6) significantly reduce, if not eliminate, all sharp bends or abrupt changes in the fluid flow path throughout the device and (7) be economically manufacturable.

SUMMARY OF THE INVENTION

We have solved the above mentioned problems by providing a fluid flow regulating device which maintains a constant fluid flow rate over a range of pressure differential across the device that utilizes an innovative flow control approach. This innovative flow control approach, in addition to accurately controlling fluid flow over a wide range of inlet/outlet, differential pressure, produces little if any measurable structure borne noise during operation.

It is accordingly one object of the present application to provide a new improved fluid flow control device, such as those used in industrial and medical applications.

Another object of the present application is to provide a fluid flow control device which maintains a constant flow rate over a range of pressure differentials and changes in inlet pressure.

Still another object of the present application is to provide a fluid flow control device for use in fluid control systems that produces little, if any, transmittable system borne noise during operation.

It is yet another object of the present application to provide a fluid flow control device which utilizes as few components as possible and is economically manufacturable.

The present application achieves the above objects by providing, in one embodiment, a movable restrictor valve element which flows the fluid into and out through a diverging flow control element cutout from a smaller inlet chamber to a larger outlet chamber and then out an outlet having, presently preferably, about the same diameter as the outlet pipe.

A second embodiment of the present invention includes an apparatus for controlling fluid flow comprising: housing means having a cavity and an inlet and an outlet operatively positioned therein; a flow control element having at least one cutout formed therein, operatively positioned in the housing means, for transferring the fluid from the inlet to the outlet; a valve element having an inner and an outer surface, operatively positioned in the housing means, for interacting with the flow control element such that more or less area of the at least one cutout is exposed to fluid from the inlet as a function of the pressure differential between the inlet and the outlet; and spring means, operatively connected to the valve element, for urging the valve element toward the outlet.

A third embodiment includes an apparatus for controlling fluid flow comprising: housing means having a cavity therein and an inlet and an outlet, the inlet and the outlet having about the same diameter; a flow control element having cutout means formed therein, operatively positioned in the housing means, for transferring the fluid from the inlet to the outlet; a valve element having an inner and an outer surface, operatively positioned in the housing means, for interacting with the flow control element such that more or less area of the cutout means is exposed to fluid from the inlet as a function of the pressure differential between the inlet and the outlet; and spring means, operatively positioned in the cavity, for urging the valve element toward the outlet such that the interaction of the cutout means and the valve element controls flow to about a constant flow rate.

A fourth very specific embodiment of the present invention is a self-regulating valve for controlling flow of a pressure fluid, comprising: a generally cylindrically annular valve body extending longitudinally about a central axis and having spaced upstream and downstream end-closure formations with inlet and outlet ports on said axis and at the respective end-closure formations, flow-control structure interposed between said ports, said structure comprising a fixed cylindrical sleeve concentric with said axis and fitted at its upstream end to the inlet end-closure formation in communication with said inlet port, said fixed sleeve having an elongate open orifice that is longitudinally precharacterized as to arcuate extent, whereby guided longitudinal positioning of said valve-member sleeve may determine the effective size of said orifice, a valve member sleeve slidably guided by and within said fixed sleeve for longitudinal displaceability for the substantial length of said fixed sleeve, said valve-member sleeve having radially inward and radially outward flange formations at its downstream end, internal cage structure within said chamber and supported by angularly spaced radial struts in radially spaced relation to said chamber, said cage structure having a cylindrical bore which is open in the upstream direction and which provides further guided support for the radially outward flange formation of said valve-member sleeve, said cage structure being closed at its downstream end, a central stem connected at its downstream end to the closed end of said cage structure, said stem having an elongate bore that is open at the upstream end of the stem, said stem having one or more radial passages for communication of upstream fluid pressure to the closed end region within said cage bore, said stem having a first shoulder in lap of a radially outer region of the radially inward flange formation of said valve-member sleeve, a preloading spring seated between said first shoulder of said stem and the radially inward flange formation of said valve-member sleeve for preloading said valve-member sleeve in opposition to upstream displacement, and stop means carried by said stem to limit valve-member sleeve displacement beyond a predetermined limit of valve-closing action, upon stop engagement with the flange of said valve-member sleeve.

Other objectives and advantages of the present application will become apparent from the following description, the accompanying drawings and the appended claims.

BRIEF DESCRIPTION OF THE DRAWINGS

FIG. 1 is a perspective view of a representative fluid flow control device of the present invention;

FIG. 6 is a view taken along line 6—6 of FIGS. 5a;

FIG. 7 is a view taken along line 7—7 of FIG. 5a;

FIG. 8 is a cross sectional view of an illustrative flow control element of the present invention;

FIG. 9 is a view taken along line 9—9 of FIG. 8;

FIG. 10 is an enlarged view of the area represented as 9 in FIG. 9; and FIG. 11 is an enlarged view of the area represented by the numeral 10 in FIG. 8;

DETAILED DESCRIPTION OF THE INVENTION

Figure 2:
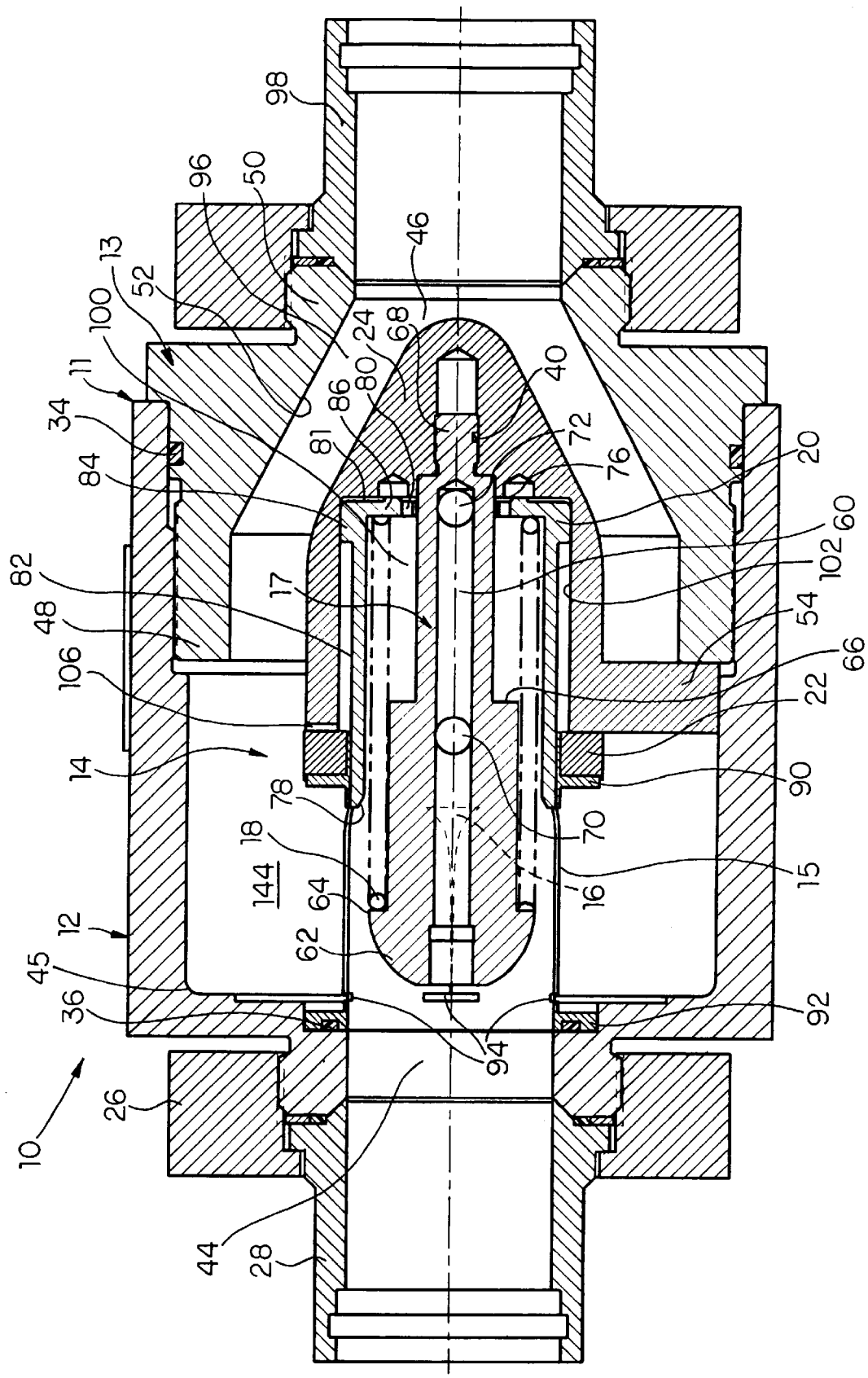
FIG. 2 is a cross sectional view of the representative fluid flow control device of FIG. 1 in the fully opened position.

As shown in FIGS. 1–12, one representative fluid flow control device or self-regulating control valve 10 of the present application comprises a housing means or valve body 11 which includes a hollow body member 12 and a hollow fitting member 13. The housing means 11 has a cavity or chamber 14 formed therein for containing various other components including a flow control element or a fixed sleeve 15, having at least one flow-control cutout or elongate radially open orifice 16. In the specific embodiments used for illustrative purposes in this application, it is presently preferred that two or four cutouts be formed in the flow control element or fixed sleeve 15. The device also includes a plunger or stem 17, a spring means 18, a valve element or valve member sleeve 20, a retainer member 22, and a cage member 24 each being operatively positioned within the cavity 14. Additionally, the body member 12 and the fitting member 13 each have means for being connected into a fluid system (not shown) such as for example threads which are adapted to mate with a standard union nut 26 and connection members 28, 98. Conventional O-rings 30, and retaining rings 32 are used to provide fluid tight seals depending on the style and pressure rating of the end connections. An o-ring seal 34 may be operatively positioned at the interface of the body member 12 and the fitting member 13. An o-ring seal 36 is also preferably operatively positioned between the flow control element 15 and the body member 12. The plunger 17 is operatively connected to the cage member 24 such as, for example, by conventional threads that lock into the mating cage 24 threads via a slug 40. Similarly, the fitting member 13 is operatively connected to the body member 12 via threads.

The housing means 11 comprises the hollow body member 12 which is preferably an annular open ended member having an inlet open end portion or inlet port 44 for connection with an inlet pipe of the fluid system (not shown) and an outlet open end portion or outlet port 46 in the fitting member 13. The diameter and/or cross-sectioned areas of the inlet open end portion 44 of the body 12 is smaller than that of the outlet open end portion 46 thereof including the end for connecting or cooperating with the fitting 13. The body member 12, as shown in cross section, is approximately U-shaped with the inlet opening 44 formed in the usually closed portion of the U.

As shown, the fitting member 13 is also hollow with the end 48 cooperating with the body member being larger in diameter and/or cross sectional area than the end 50 ultimately connected to the outlet piping (not shown). The inside surface 52 of the fitting 13 is contoured such that the diameter and/or cross-sectional area of the cavity 14 (see FIG. 2) formed by the connection of the body member 12 with the fitting 13 has the largest diameter and cross sectional area at the point where the fitting 13 and the body member 12 abut with the cavity 14 diameter and/or cross-sectional area tapering to the diameter and/or the cross sectional area of the outlet piping which is, preferably, about the same or larger cross sectional area as the inlet piping. Both the body member 12 and the fitting member 13 preferably include means for providing for their operative connection in any conventional manner as well as conventional means for connection with the fluid piping system.

Figure 3:
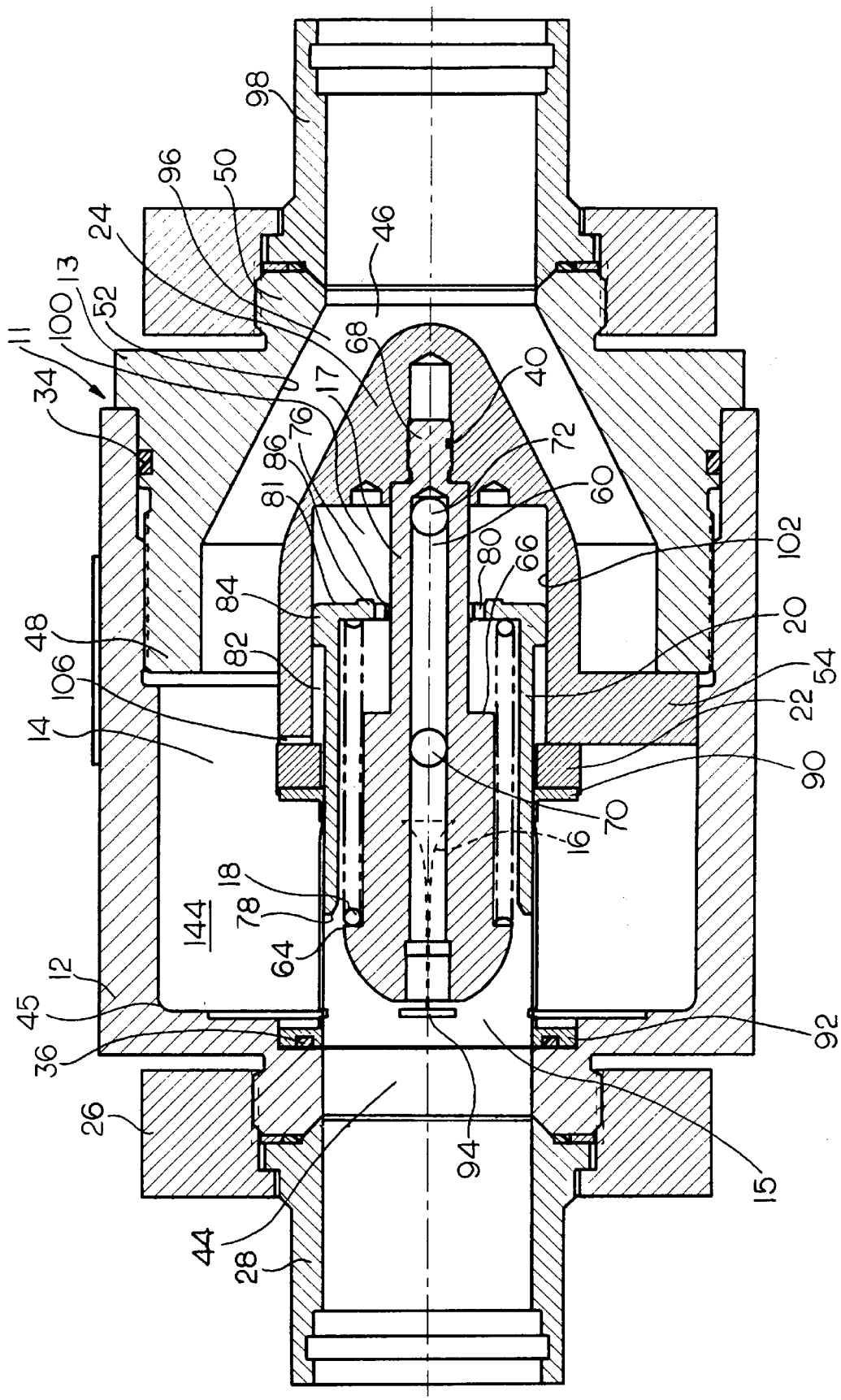
FIG. 3 is a cross sectional view of the fluid flow control device of FIG. 2 in an intermediate opened position.

The cage member 24 preferably has a general conical shape and, preferably, at least three flange members or angularly spaced radial struts 54, 56, 58 (see FIG. 5a) for operatively positioning the cage 24 within the cavity 14. When positioned inside the cavity 14, the cage member 24 is secured in position by the flange members 54, 56, 58 which are positioned between the fitting member 13 and the retainer 22, as shown in FIGS. 2 and 3. The cage member 24 includes at least one and preferably a plurality of apertures 106 formed in its base for a purpose to be explained later.

The plunger or central stem 17 comprises an elongate member having an internal passage or bore 60 drilled from the head 62 toward the other end thereof. A first shoulder 64 is formed in the plunger 17 at a point proximate the conical shaped head 62 thereof and extending about midway toward the other end. At this point, a second shoulder 66 is formed reducing the diameter/cross-sectional area of the plunger 17 even further. This second shoulder 66 extends to a point proximate the other end 68 of the plunger 17. At least two holes 70, 72 are bored at about a ninety (90°) degree angle to the axis of the plunger 17, one hole 70 at a point between the first shoulder 64 and the second shoulder 66 and the other hole 72 between the shoulder 64 and the end 68, for purposes which will be described later. The plunger 17 is conventionally operatively connected to the cage member 24 and is positioned such that at least a portion of the plunger 17 extends toward the inlet end 44 of the body member from the cage member 24.

Figure 4:
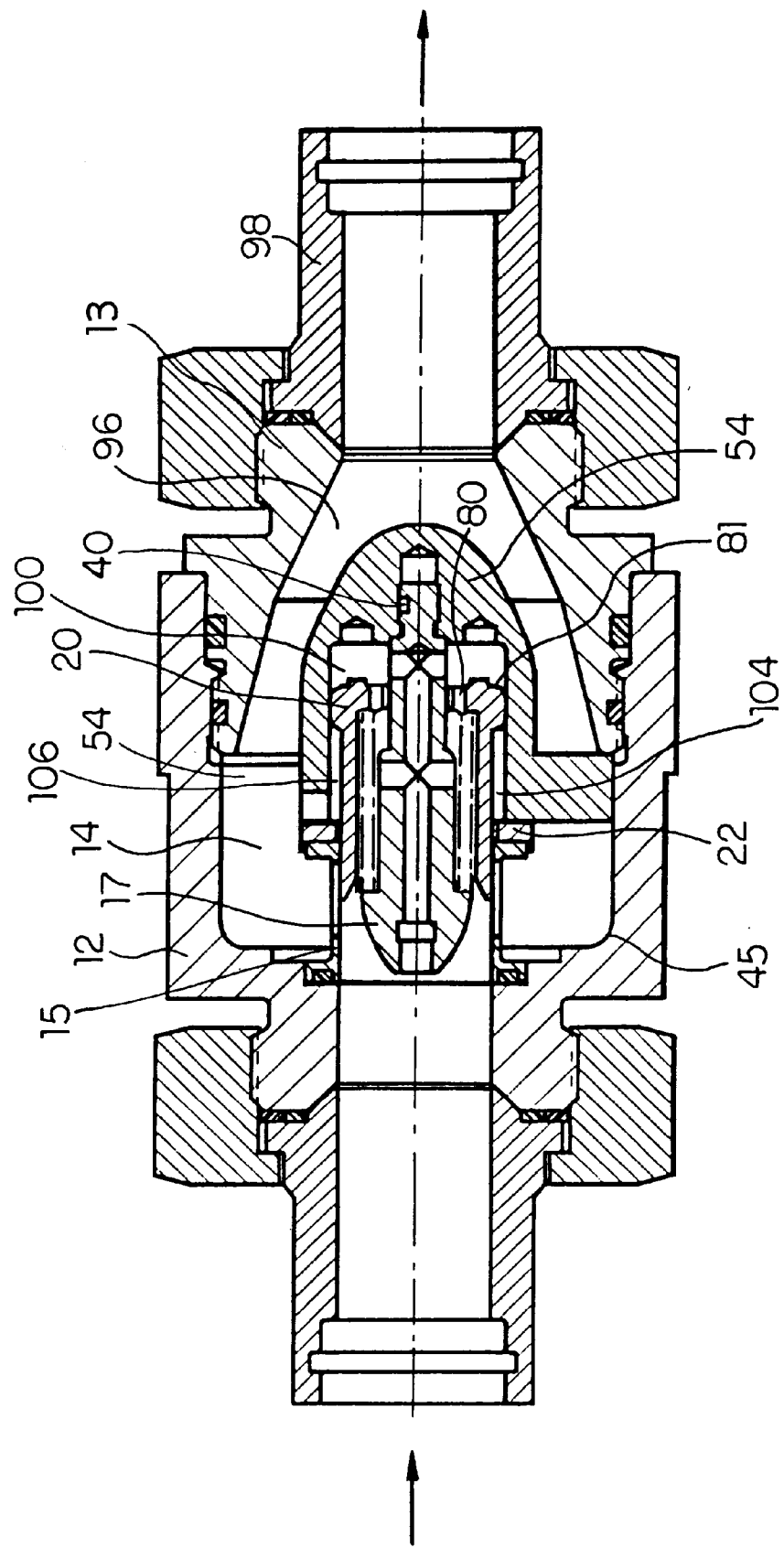
FIG. 4 is a cross sectional view of the fluid flow control device of FIG. 3 in an intermediate opened position and illustrating the relationship between the inlet pressure and the outlet pressure.
Figure 5A:
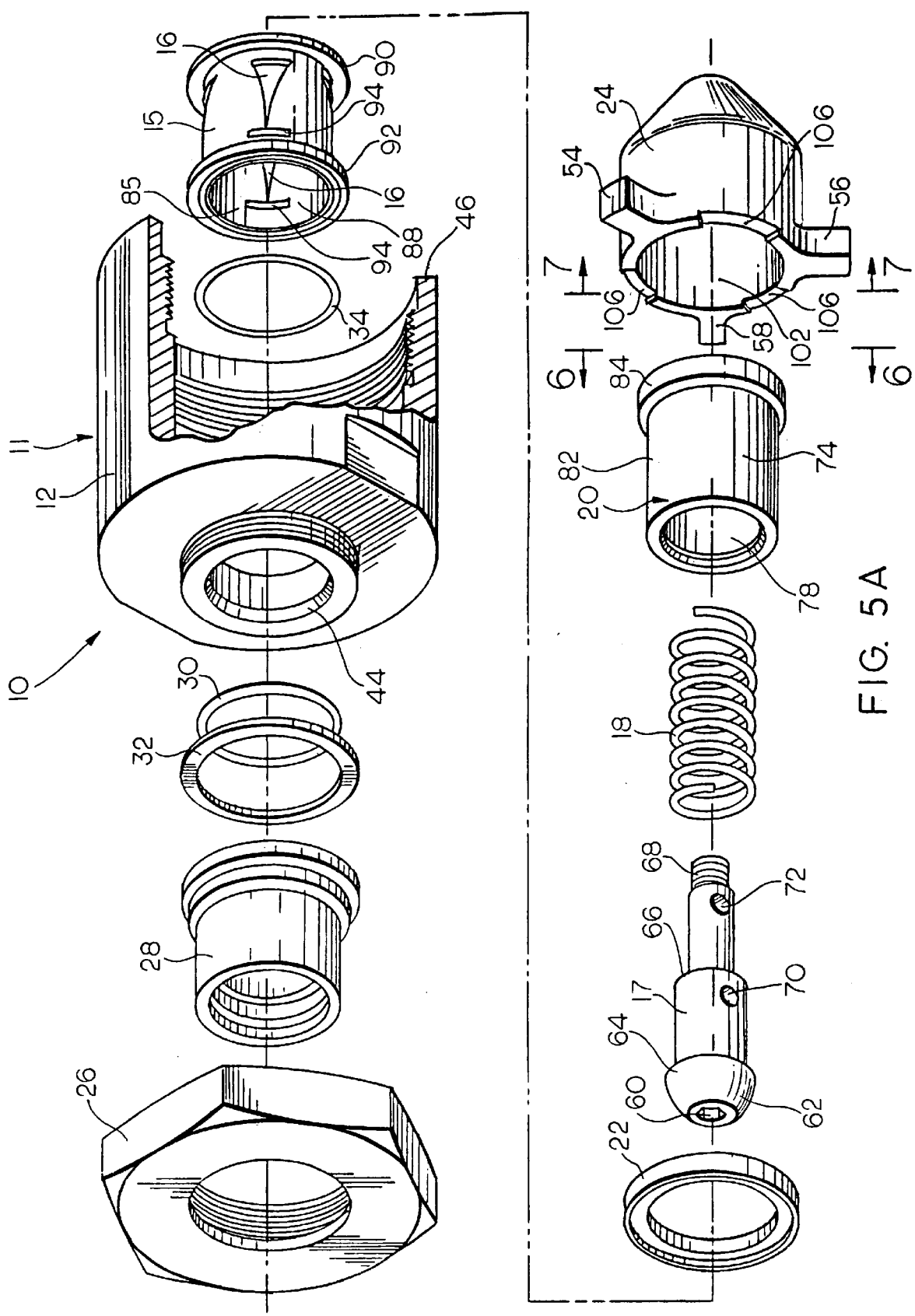
FIGS. 5a and b are an exploded view of the representative fluid flow control device of FIGS. 1, 2, 3 and 4.
Figure 5B:
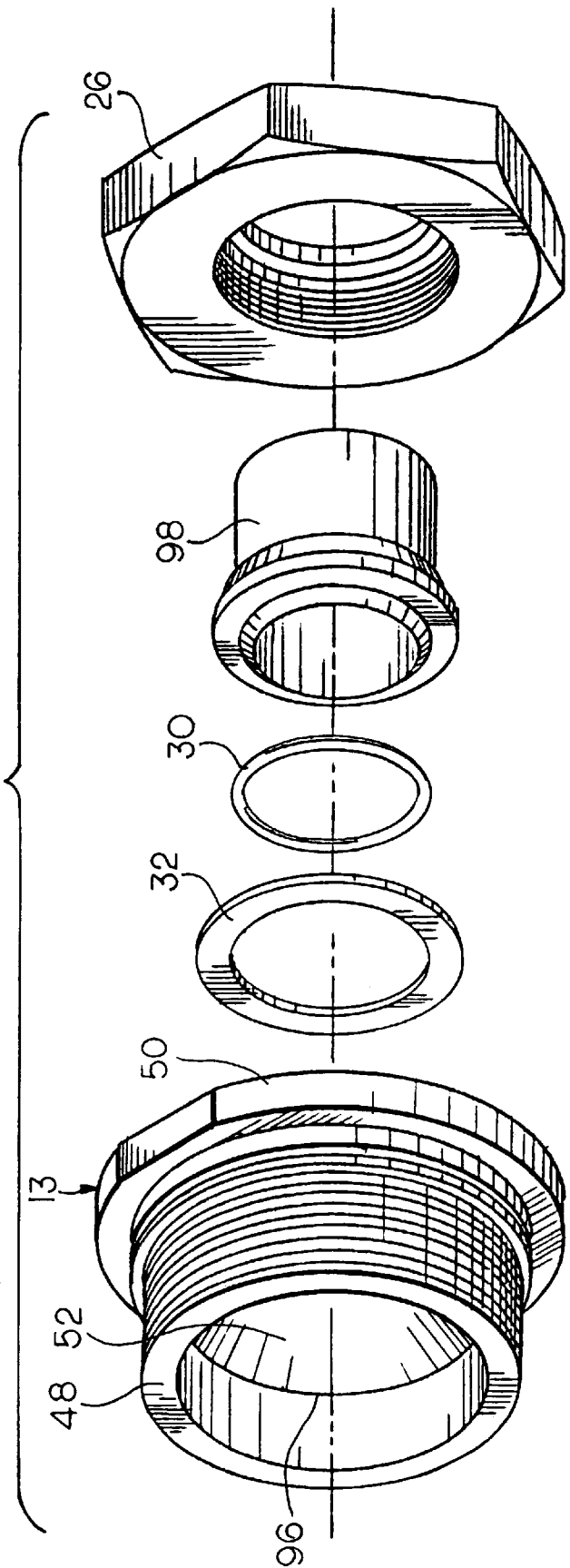

As illustrated in FIG. 5a, the valve element 20 comprises a basically cylindrical shaped member 74 having an open upstream end 78 and a smaller aperture 76 (see FIG. 6) formed in the downstream end. The aperture 76 has about the same diameter as the second shoulder 66 formed on the plunger 17 member for cooperation therewith. As shown in cross-section in FIGS. 2–4, the valve element 20 appears as a basic U shaped member 74 with the aperture 76 being formed in the base of the U. A radially outward flange 84 and a radially inward flange 86 are located on the downstream end of the valve element 20 proximate the aperture 76.

When assembled, after the resilient means 18 described below is first positioned on the plunger, the valve element 20 is placed over the plunger 17 with the open end 78 being inserted over the end portion 68 of the plunger 17 toward the head 62 of the plunger 17. The distance that the internal mating portion of the valve element 20 travels prior to contact with the second shoulder 66 of the plunger 17 will be described later.

Aperture means 80 for fluid communication between the back face 81 of the valve element 20 and the hollow portion of the valve element 20 are formed in the valve element 20 between the aperture 76 and the radially inward flange 86 of the valve element 20. The radially outward flange 84 extends out from the external wall 82 of the valve member 20 and has a larger diameter/cross sectional area than the outer wall 82 of the valve element 20 which slides along the inner surface of the flow control element 15 (see FIG. 5a). The outer wall 82 of the valve element 20 has about the same diameter as the inlet 44 and about the same diameter as the flow control element 15. As mentioned above, at least a portion of the outer surface of valve element 20 is designed to slide along the inner surface 85 of the flow control element 15 (see FIG. 3). The valve element 20 is positioned around the plunger 17 and is slidable with respect to the plunger 17 via aperture 76.

Resilient means 18, preferably a spring, is positioned between the plunger 17 and the valve element 20. The spring 18 member is preferably positioned around the plunger 17 and has about the same diameter as the first shoulder 64 formed in the plunger 17 with one end of the spring 18 contacting the end of the first shoulder 64 nearest the inlet end 62 of the plunger 17 and the other end of the spring 18 contacting the radially inward flange formation 86 on the inside wall of the valve element 20, as shown in FIGS. 2, 3, 12 and 13.

As best shown in FIGS. 5*a*, 8 and 9, the flow control element 15 preferably comprises a cylindrical member, made of a plurality of possible different materials, such as, for example, the following including, but not limited to, stainless steel, bronze, aluminum, titanium, plastic, Hastolloy, etc. having a bore 88 formed therein with a flange 90, 92 at each end of the bore. At least one cutout 16 is formed in the cylindrical member. At least two cutouts and as many as four cutouts are shown formed in the cylindrical member in the specific representative drawings used in the present application. When four cutouts 16 are utilized, the cutouts 16 are positioned at approximately ninety (90°) degrees with respect to the adjacent cutout(s), it being understood that more than four cutouts could be used in a specific situation.

It should be understood that at least one cutout is required for the present invention to operate and that the number of cutout(s) sufficient for the operation is influenced by the available space to accommodate the specific shape of the cutout(s) required for a specific device and by the area of the cutout(s) exposed to the inlet fluid for any given inlet/outlet pressure differential. It should also be understood that the fixed sleeve having the cutout or elongate radially open orifice could be readily removed from the device 10 and a plurality of different fixed sleeves having a plurality of different configurations could be substituted therefore. However, the configuration of the cutout(s) is limited only by the requirement that the orifice produced is adequate to achieve a predetermined flow rate over a predetermined pressurized differential and/or some other desirable end result.

As will be fully developed, the geometry or shape of the cutout 16 is specific for each individual application and has been found in the specific illustrations shown in the drawings to approximate the shape shown in FIGS. 3, 5*a* and 8 for one specific flow control application. The slot 94 of the illustrated shape is positioned proximate the inlet end 44 of the fluid flow control device 10. The flow control element 15 is positioned inside the cavity 14 with one end held in position by the inner wall of the body member 12 nearest the inlet 44 and the second end positioned against the retainer 22 supported by the cage member 24 (see FIGS. 2 and 3).

As shown in FIG. 2, the valve element 20 is in the full open position with the spring 18 biasing the valve element 20 toward the outlet end 46 of the housing 11. Suffice it to say that the difference in pressure between the inlet port 44 and the outlet port 46 is operative to position the valve element 20 at various positions relative to the flow control element 15, thus, controlling the relative amount of the orifice or cutouts 16 exposed to fluid from the inlet port 44 such that fluid is allowed to flow from the inlet port 44 through the flow control element cutout(s) 16 and into an outlet flow chamber 144 in the cavity 14.

In normal operation, fluid enters the fluid flow control device 10 through the inlet connection 28 and flows into the body member 12 having an initial internal diameter which matches that of the inlet connection 28. The fluid then flows through the cutouts 16 of the flow control element 15, which, presently preferably, has the same internal diameter as the inlet connection 28 and the body member 12, radially outward and downstream into the outlet flow chamber 144. The use of the same initial internal diameter for the inlet 44 of the body member 12 as the mating inlet connection 28 and for the control element 15 is believed to reduce turbulence, noise and pressure drop.

As best shown in FIG. 4, the differential pressure between the inlet port 44 and the outlet port 46 acts on an outlet pressure sensing chamber 104 and an inlet pressure sensing chamber 100 of the device 10. The outlet pressure sensing chamber 104 defined as the volume bounded by the inner diameter or inner surface of the cage bore 102, the retainer 22, the valve element 20 outer surface 82 which slides through the retainer 22 and the valve element 20 surface which slides on the inner surface of the cage bore 102. The outlet flow chamber 144 is defined as the volume which is bounded by the retainer 22, the outer diameter on the cage member 24, the inner diameter of the body member 12 and the bottom or inner surface of the fitting member 13. The outlet flow chamber 144 communicates with the outlet pressure sensing chamber 104 via the apertures 106 in the bottom of the cage 24. The outlet pressure force on the valve element 20 is therefore due to the sensing chamber differential area and forces the valve element 20 toward the outlet of the fitting 13. Fluid then continues to flow through the channel 96 between the fitting member 13 and the cage member 24, and out through the outlet connection 98.

Key to the successful operation of the fluid flow control device 10 of the present application is the interaction between the valve element 20, the flow control element cutout 16, and the spring 18, relative to the upstream (inlet) and downstream (outlet) pressure conditions.

As shown in FIGS. 2, 3, 4 and 6 inlet pressure is ported through an internal passage 60 in the plunger 17 and also through holes 80 in the downstream end of the valve element 20 to the inlet pressure sensing chamber 100 between the valve element 20 and the bottom or internal surface 102 of the cage bore. The inlet pressure acts over the area of the back face 81 of the valve element 20 forcing the valve element 20 toward the inlet 44. However, inlet pressure opposes this motion by acting over the valve element area which slides through the retainer 22, forcing the valve element 20 toward the outlet 48. The net force on the valve element 20 due to inlet pressure is therefore a force toward the inlet 44 of the fluid flow control device 10 resulting from the differential areas between the back face 81 of the valve element 20 and the inlet diameter of the valve element 20 as expressed by the following equation:

$$F_{inlet} = P_{inlet} \times (A_{valve\ element\ back\ face} - A_{valve\ element\ ID})$$

The outlet pressure of the device 10 is ported from the outlet flow chamber 144 into the outlet pressure sensing chamber 104, through sensing apertures or holes 106 in the side of the cage member 24 (see FIG. 5*a*). The outlet pressure force on the valve element 20 is therefore due to the sensing chamber differential area and forces the valve element 20 toward the outlet 50 of the fitting 13. It should be apparent that this sensing chamber differential area is the same differential area that inlet pressure acts on in the opposite direction as expressed by the following equation:

$$F_{outlet} = P_{outlet} \times (A_{valve\ element\ back\ face} - A_{valve\ element\ ID})$$

The third force acting on the valve element 20 is due to the spring 18 and aids the outlet pressure to force the valve element 20 toward the outlet 46. This force is simply the preload of the spring 18 plus any additional compression times the rate, as expressed by the following equation:

$$F_{spring} = F_{preload} + k\Delta x$$

For any static position of the valve element 20, therefore, the following relation holds:

$$F_{preload} + k\Delta x + P_{outlet} \times (A_{valve\ element\ back\ face} - A_{valve\ element\ ID}) = P_{inlet} \times (A_{valve\ element\ back\ face} - A_{valve\ element\ ID})$$

Substituting for pressure differential (ΔP) and area differential (ΔA), the following equation is obtained:

$$F_{preload} + k\Delta x = \Delta P \times \Delta A$$

The above equation is used to calculate the exact position of the valve element 20 within the valve element stroke, which is defined as the distance the valve element 20 travels from the full open position where the entire area of the flow control element orifice or cutout(s) 16 is exposed to incoming fluid to the full closed position where the valve element blocks the entire orifice or cutout(s) 16 except, in certain applications described below, for the slot 94 at the upstream or inlet end of the cutout(s) 16, for any given set of inlet and outlet pressures within a predetermined range of pressures. Therefore, a linear relationship exists between the valve element 20 stroke and pressure drop, since the area differential, spring rate and preload are all fixed. However, it is possible to utilize a non-linear spring with the present invention, as is known to those skilled in the art.

The ability to prevent the complete blockage of the cutout(s) is an improved feature relative to the prior art devices mentioned above. The prior art devices were not designed to prevent the complete blockage of the fluid flow from the inlet to the outlet.

Figure 12:
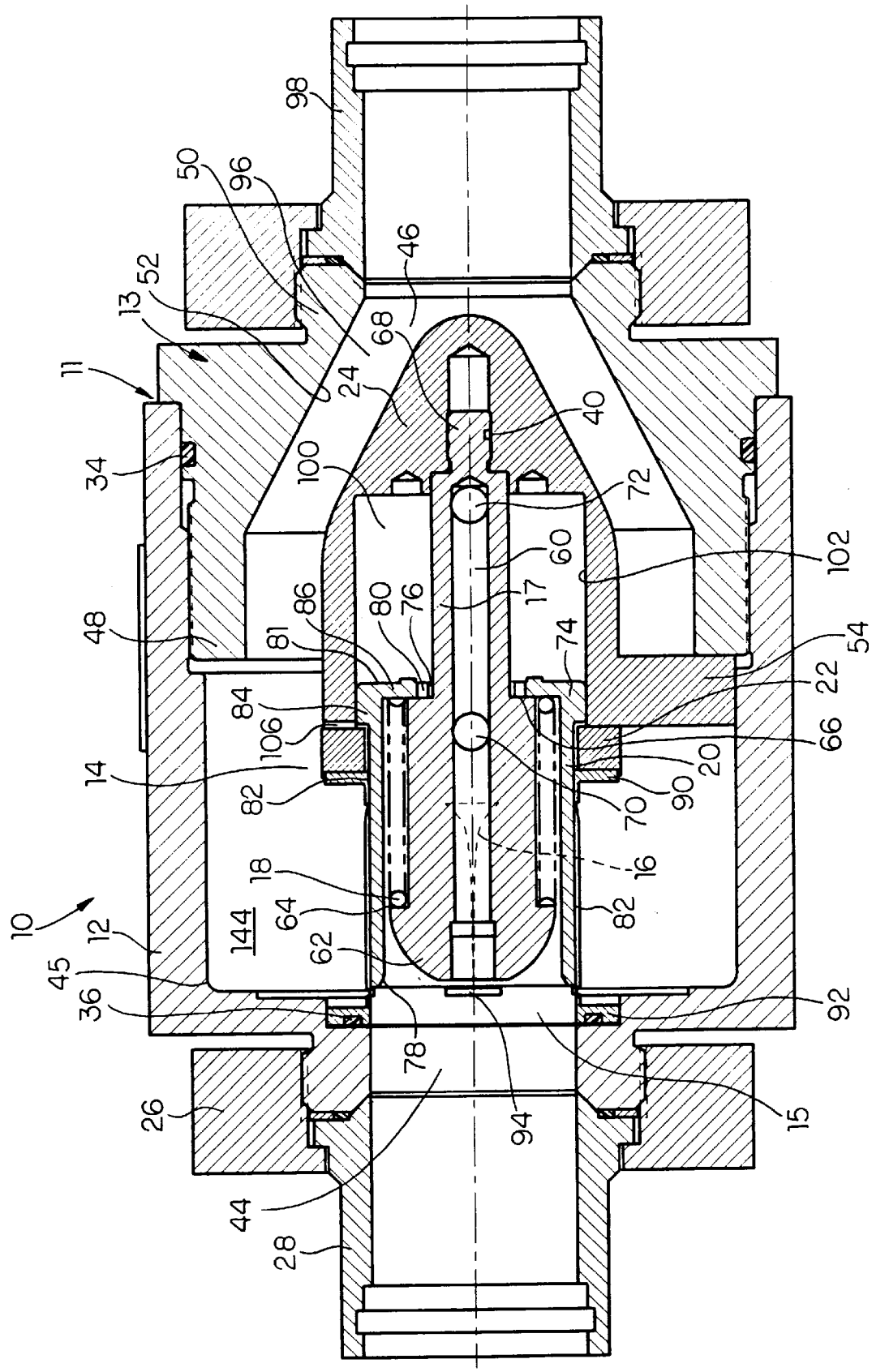
FIG. 12 is a cross sectional view of the fluid flow control device of FIG. 2 in the full closed position showing the slot being unblocked.

As illustrated in the specific embodiment shown in FIG. 12, the second shoulder 66 prevents the valve element 20 from fully closing the cutout(s) 16. Thus, if the ΔP exceeds the maximum predetermined ΔP, fluid flow will not suddenly cease flowing through the cutout(s) 16 but will increase at the rate of a fixed orifice. This feature of the embodiment of FIGS. 1–12 ensures that the device 10 will remain stable and will not experience any potentially catastrophic system pressure surges.

While the use of the interaction of the radially inward extending flange 86 with the second shoulder 66 is a preferred structural embodiment for limiting the displacement of the valve member relative to the flow control element, any other alternative structural interaction which accomplishes the desired displacement is intended to be included within the present application. Alternative structural interactions include but are not limited to, the interaction of the radially outward flange 84 with the retainer member 22 or any other structural interactions that might be devised by those skilled in the art.

In order to maintain a desired or a predetermined constant flow rate from the outlet port 46 for any pressure differential within the predetermined pressure differential range, it becomes the function of the flow control element 15 to ensure that the correct flow area through the elongate radially open orifice or cutout(s) 16 is exposed to inlet fluid for any given pressure differential.

In order to implement the fluid flow control device 10 of the present invention, it is only necessary to determine the operating differential pressure range [i.e., the lowest and highest differential (inlet minus outlet) pressure expected in the system] desired for the device. The flow area of the flow control element cutout(s) 16 required to maintain constant flow for the linear stroke device of the present invention for the devices illustrated in the drawings has the particular shape as shown. It should be understood that the particular geometric shape of the orifice or cutout(s) 16 is unique to each device according to a plurality of different parameters including, but not limited to, the desired constant flow rate, the selected pressure differential, the available envelope to position the device for a specific application, etc.

In operation, the varying pressure differential between the inlet and the outlet positions the valve element 20 to either expose more or less of the flow control element cutout(s) 16, as the pressure differential (ΔP) decreases or increases, respectively. As ΔP increases, the valve element 20 blocks relatively more of the flow control element 15 cutout(s) 16 and as ΔP decreases, the valve element 20 blocks relatively less of the flow control element 15 cutout(s) 16, resulting in a constant flow rate at the outlet port 46. When the ΔP is at the minimum design value, the valve element 20 is positioned such that the entire area of the flow control element 15 cutout or elongate radially open orifice 16 is exposed so that inlet fluid can move through the orifice into the outlet flow chamber 144 in the cavity 14, as shown in FIG. 2.

It is believed that the fluid flow control device 10 of the present application is effective to suppress noise, at least in part, due to the shape and orientation of the cutout(s) 16 positioned in the flow control element 15. As previously mentioned, the inner diameter of the flow control element 15 matches the inlet diameter of the body 12 and the inlet connection 28. There are, therefore, no abrupt changes in the fluid stream as a result of changing geometry in the inlet of the device. As fluid flow passes through the cutout(s) 16, the fluid diverges into the outlet flow chamber 144, which has a much larger cross-sectional area than the inlet passage cross-sectional area at the point the fluid moves through the cutout(s) 16. Thus, fluid velocities are minimized as the fluid exits the control restriction (of the flow control element orifice) into the outlet flow chamber 144. The representative cutout(s) 16 in the flow control element 15 are preferably oriented such that the wide end is downstream of the rectangular shaped slot 94. As the fluid moves from the inlet port 44 into the outlet flow chamber 144, this orientation also tends to diverge rather than converge the fluid flow at the point of pressure reduction.

Another feature which assists with noise suppression is that all surfaces in the fluid stream are contoured and made relatively smooth to at least reduce and hopefully eliminate the chance of turbulence developing in the fluid stream. The cage 24 is contoured or rounded near the outlet port 46 and the three struts 54, 56, 58 which hold the cage in place all have generous radii on the corners in the fluid stream. The head 62 of the plunger 17 is rounded and smooth which also aids to diverge the flow toward the inner surface of the flow control element 15. The corners 45 of the bottom of the body member bore are rounded to at least reduce and hopefully prevent turbulence as the fluid flows around the corner. The inside surface of the fitting member 13 is sloped such that a gradual reduction of cross-sectional area into the outlet connection 98 is achieved. All changes in the fluid stream geometry are designed to be gradual and as smooth as practicable, thereby, assisting with noise suppression.

An additional feature of note which suppresses noise is that the fluid flow impingement on surfaces is minimized. This is due, in part, to the diverging and contoured features already described and to the inner diameter of the body member 12 being sufficiently large that impingement noise is virtually eliminated.

It should be noted that the fluid flow control device of the present application can be easily redesigned to operate in reverse by inverting the internal components such that inlet pressure enters into the device from what has been described above as the outlet port 46. Fluid flow would then pass around the outside of the cage 24, past the cage struts 54, 56, 58 and into the flow control element 15 before exiting what was previously the inlet port 44 of the device 10.

All that is required to operate the device in reverse is to determine the inlet and outlet pressures using the sensing chambers 100, 104 as defined above. This can easily be done by blocking the valve element 20 and plunger 17 sensing holes 80 in the back face 81 of the valve element and drilling a hole or bore from the rounded end of the cage 24 to the inlet sensing volume or inlet pressure sensing chamber 100 described above. The outlet pressure would then be routed to the outlet pressure sensing chamber 104 described above through a hole throughout the wall of the valve element 20 just below the radially outward flange 84 and by blocking the existing cage sensing holes 106.

While it is believed that this alternative method of operation might be somewhat noisier, it would still be a viable alternate method for fluid flow control and would utilize the innovative fluid flow control element of the present application.

Figure 13:
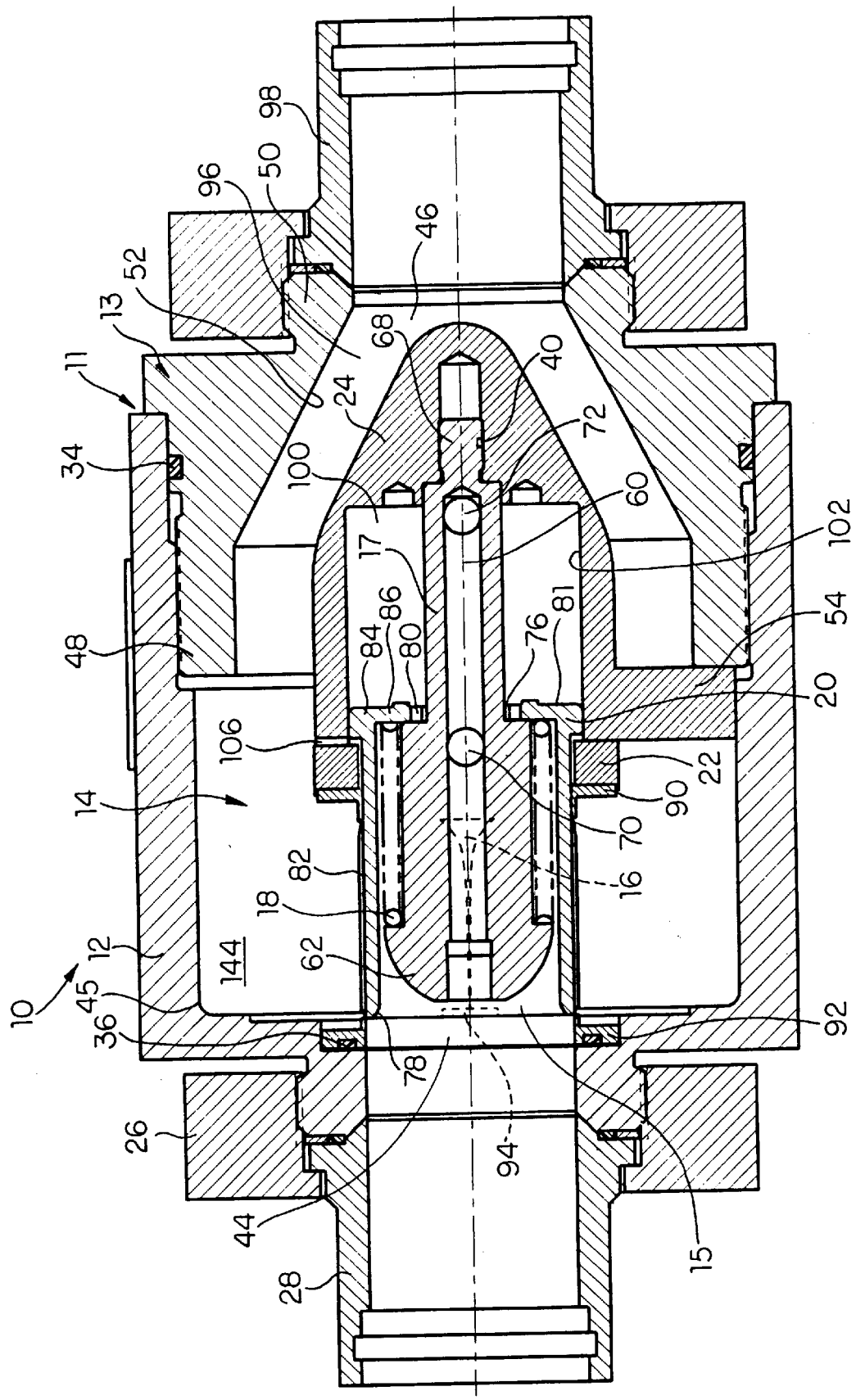
FIG. 13 is a cross sectional view of an alternative fluid flow control device in the full closed position showing the slot being blocked.

For certain applications where it may be desirable to have the capability for completely stopping fluid flow from the inlet through the orifice and out the outlet of the flow control device, modifications can be made to accommodate such requirements as best illustrated in FIG. 13. For example, in the specific embodiment shown in FIG. 13, the first shoulder 64 formed in the plunger 17 could be relocated closer to the inlet or the overall length of the valve member sleeve 20 could be increased such that the orifice 16 and the slot 94 are completely blocked by the valve member sleeve. Thus, if the ΔP exceeds the maximum predetermined ΔP, fluid will cease flowing through the cutout or the orifice 16 and the slot 94 due to the orifice 16 and the slot 94 being covered by the upstream end 78 of the valve member sleeve 20.

This feature could be desirable should the downstream closed fluid system rupture with the resulting loss of fluid and drop in outlet pressure. The sudden drop in outlet pressure could cause a predetermined maximum differential pressure to be exceeded. With the sudden drop in outlet pressure, the valve member sleeve would block the entire orifice 16 area and the slot 94 such that fluid flow to the outlet port would be terminated. This specific embodiment might be useful to indicate a malfunction in the closed fluid system downstream of the flow control valve and continued constant flow might be undesirable. During normal operation within the predetermined pressure differential range, the device shown in FIG. 13 would operate as described above with the slot 94 allowing flow at the maximum predetermined pressure differential until the maximum predetermined pressure differential was exceeded.

Figure 14:
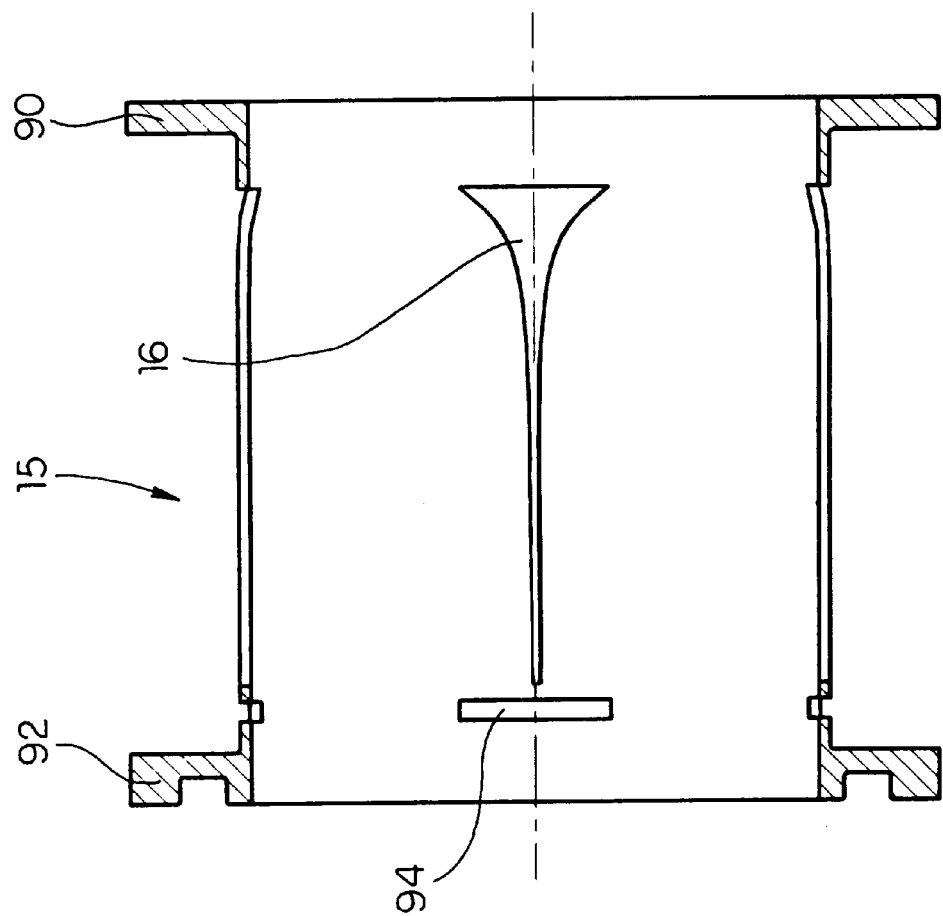
FIG. 14 is a cross sectional view of an alternative illustrative flow control element of the present invention showing the slot and the orifice as being separated.

FIG. 14 is a cross-sectional illustration of an alternate embodiment of a flow control element useful with the present invention. As illustrated, in contrast to the flow control element of FIGS. 5a, 8 and 10, the open orifice 16 has been divided into two separate and distinct portions with the open slot 94 being physically separated from the precharacterized orifice 16. Specifically, the precharacterized orifice 16 terminates at one longitudinal end of the flow control element and the angularly extending slot formation 94 is positioned near but at longitudinal offset beyond the upstream longitudinal end of the precharacterized orifice 16. This particular configuration could be used in a system where shutoff is desired at a different pressure differential which is sufficiently higher than the maximum operating pressure differential.

Figure 15:
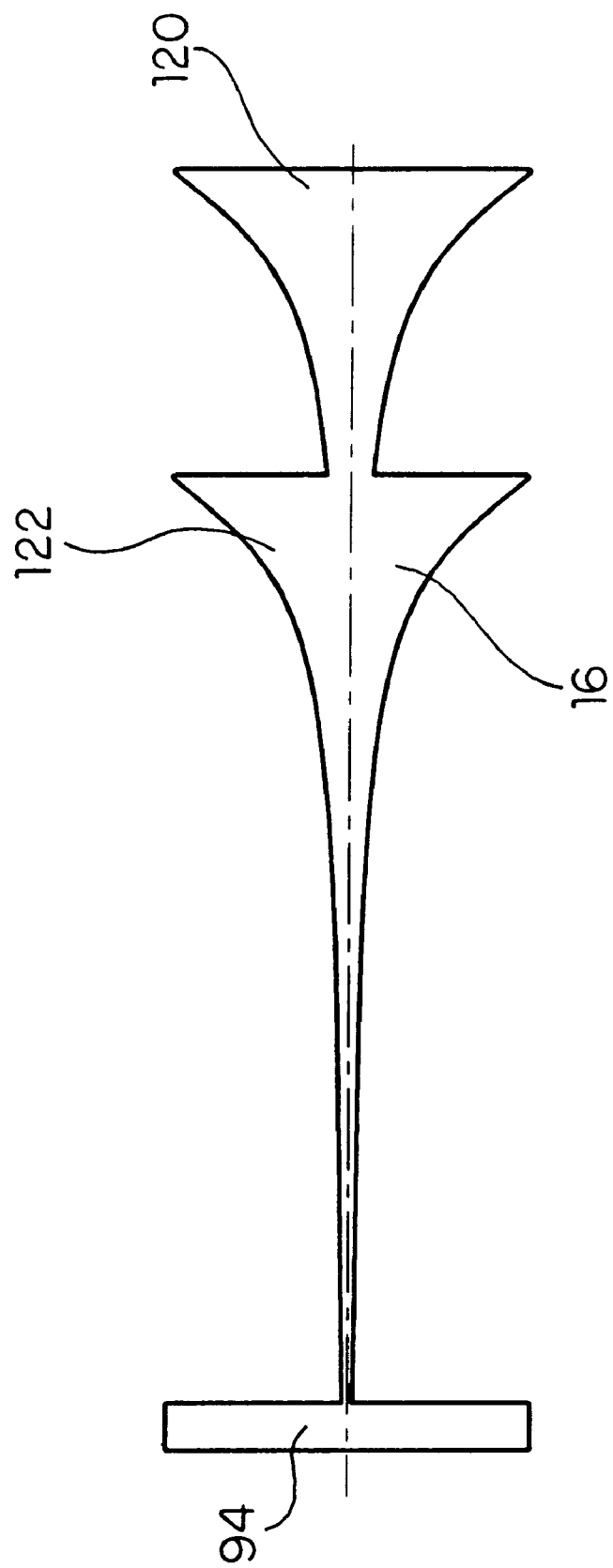
FIG. 15 is an enlarged view of an illustrative alternative embodiment of the precharacterized orifice useful with the present invention.

FIG. 15 illustrates yet another alternative embodiment of a precharacterized orifice useful with the present invention. As shown in FIG. 15, the precharacterized orifice comprises a longitudinally distributed plurality of precharacterizations wherein a first precharacterization 120 reduces from the maximum angular extent to a lesser angular extent at a location intermediate the upstream and downstream ends of the orifice. A second precharacterized orifice 122 commences at the intermediate location such that the maximum angular extent of the second longitudinally extending precharacterization extends to and merges with the slot 94, as shown in FIG. 15. Alternatively the second longitudinally extending precharacterization could be terminated at the upstream end of the fixed sleeve or flow control element at a longitudinal offset proximate but not merging with the angularly extending slot 94 such that the angularly extending slot formation is at a longitudinal offset beyond the upstream end of the plurality of precharacterized orifices 120, 122. This particular configuration could be used, for example, in a system where two different controlled flow rates are required, depending on differential pressure ranges.

While only two longitudinally distributed plurality of precharacterization orifices are illustrated, it should be understood that any number of precharacterizations could be incorporated depending upon the particular application and the longitudinal length of the flow control element required for a specific application.

Flow Control Element Design

An important feature of the fluid flow control device 10 and method of the present application is the design of the flow control element 15 and specifically the cutout(s) 16 of the flow control element 15. In order to design the flow control element 15 for fluids including liquids and gasses, it is believed that the following parameters must be first defined as a minimum: 1) the fluid being used in the device 2) the inlet pressure range 3) the outlet pressure range and 4) the desired constant flow rate.

The valve element 20 positioning relative to the cutout(s) 16 in the flow control element 15 is determined by use of the equations described earlier. Once the positioning of the valve element 20 is determined, the flow area of the flow control elements cutout(s) 16 can be calculated using standard valve sizing equations for a given pressure differential/valve element position. The standard valve sizing equations used to determine the geometric shape of the cutout(s) illustrated in the drawings of the present application are readily obtainable by reference to Lyon's Valve Designer's Handbook, published by Van Nostrand Reinhold Company, in 1982 or Aerospace Fluid Component Designers'

Handbook, Volume I, Revision D, available from TRW Systems Group, One Space Park, Redondo Beach, Calif., published in February 1970, the disclosure of each is herein incorporated by reference. The standard valve sizing equations used for a specific application will vary based on the fluid and it's compressibility. As an example, the flow equation utilized for an incompressible liquid would be as follows:

$$Q = C_d * A * (2 * g_c * (P_{inlet} - P_{outlet})/\rho)^{1/2}$$

Q=Flow Rate
$C_d$=Discharge Coefficient
A=Flow Area
$g_c$=Gravitational Constant
$P_{inlet}$=Inlet Pressure
$P_{outlet}$=Outlet Pressure
$\rho$=Fluid Density All of the flow control elements that were built were designed in like manner as described above.

During the development of the specific embodiments shown in the drawings, it was determined that, for fluid flow control devices of the type used methods for producing the particular geometrical shape of the cutouts to the accuracy required include, but are not limited to: Wire EDM cutting milling, laser cutting, etc.

It is believed that the flow control elements for fluid flow control devices designed to provide constant higher or lower fluid flow rates for a plurality of fluids could be designed and manufactured using the teachings, as described above. It is further believed that the flow control elements for devices providing either higher or lower fluid flow rates could be readily designed and made by those skilled in the art following the teachings of the present application. It is also believed that the present fluid flow control device using the principles of the present invention can be scaled up or down as desired.

Changes and modifications in the specifically described embodiments can be carried out without departing from the scope of the invention which is intended to be limited only by the scope of the appended claims.

What is claimed is:

1. An apparatus for controlling fluid flow comprising:

housing means having a cavity and an inlet and an outlet operatively positioned therein, said inlet and outlet each having a longitudinal central axis and positioned such that said central axes coincide with one another;

at least one of a plurality of possible flow control elements having at least one cutout means formed therein, operatively positioned in the housing means, for transferring the fluid from the inlet to the outlet;

a valve element having an inner and an outer surface, operatively positioned in the housing means, for interacting with the flow control element such that more or less area of the at least one cutout means is exposed to fluid from the inlet as a function of the pressure differential between the inlet and the outlet; and spring means, operatively connected to the valve element, for urging the valve element toward the outlet, said spring means having a longitudinal central axis in the direction of its displacement, said axis of said spring means coinciding with said axes of said inlet and outlet.

2. The apparatus of claim 1 further comprising:

an outlet pressure sensing chamber in fluid communication with the outlet pressure; and an inlet pressure sensing chamber in fluid communication with the inlet pressure.

3. The apparatus of claim 1 further comprising:

a cage member operatively positioned within the cavity.

4. The apparatus of claim 3 wherein the cage member further comprises:

fluid communication means for communicating the outlet pressure from an outlet flow chamber to an outlet pressure sensing chamber.

5. The apparatus of claim 1 wherein the valve element further comprises:

means for communicating the inlet fluid pressure to the outer surface of the valve element.

6. The apparatus of claim 1 further comprising:

means for maintaining at least a minimum fluid flow through the control element regardless of whether the inlet/outlet pressure differential has exceeded a predetermined range.

7. An apparatus for controlling fluid flow comprising:

housing means having a cavity and an inlet and an outlet operatively positioned therein, the housing means further comprising a hollow body member including the inlet, the housing means further comprising a hollow fitting member including the outlet;

at least one of a plurality of possible flow control elements having at least one cutout means formed therein, operatively positioned in the housing means, for transferring the fluid from the inlet to the outlet;

a valve element having an inner and an outer surface, operatively positioned in the housing means, for interacting with the flow control element such that more or less area of the at least one cutout means is exposed to fluid from the inlet as a function of the pressure differential between the inlet and the outlet; and spring means, operatively connected to the valve element, for urging the valve element toward the outlet.

8. An apparatus for controlling fluid flow comprising:

housing means having a cavity and an inlet and an outlet operatively positioned therein, the housing means further comprising a hollow body member including the inlet, the housing means further comprising a hollow fitting member including the outlet, the body member further comprising a first open end portion for connection with an inlet pipe of a fluid system, the body member further comprising a second open end portion for cooperation with the fitting member, the first open inlet end having an inlet about the same diameter as a fluid system inlet pipe, the second open end portion diameter being larger than the diameter of the first open end portion;

at least one of a plurality of possible flow control elements having at least one cutout means formed therein, operatively positioned in the housing means, for transferring the fluid from the inlet to the outlet;

a valve element having an inner and an outer surface, operatively positioned in the housing means, for interacting with the flow control element such that more or less area of the at least one cutout means is exposed to fluid from the inlet as a function of the pressure differential between the inlet and the outlet; and spring means, operatively connected to the valve element, for urging the valve element toward the outlet.

9. An apparatus for controlling fluid flow comprising:

housing means having a cavity and an inlet and an outlet operatively positioned therein, the housing means further comprising a hollow body member including the inlet, the housing means further comprising a hollow fitting member including the outlet, the fitting member further comprising a first end portion for cooperating with the body member, the fitting member further comprising a second end portion for connecting to a fluid system outlet pipe, the first end portion being larger in cross sectional area than the second end portion, the inside surface of the fitting being contoured such that the diameter of the cavity formed by the connection of the housing with the fitting has a larger cross sectional area than the hollow body inlet, the cavity cross-sectional area tapering to about the cross sectional area of the outlet, the outlet having about the same or greater cross-sectional area as the inlet;

at least one of a plurality of possible flow control elements having at least one cutout means formed therein, operatively positioned in the housing means, for transferring the fluid from the inlet to the outlet;

a valve element having an inner and an outer surface, operatively positioned in the housing means, for interacting with the flow control element such that more or less area of the at least one cutout means is exposed to fluid from the inlet as a function of the pressure differential between the inlet and the outlet; and spring means, operatively connected to the valve element, for urging the valve element toward the outlet.

10. An apparatus for controlling fluid flow comprising:

housing means having a cavity and an inlet and an outlet operatively positioned therein;

at least one of a plurality of possible flow control elements having at least one cutout means formed therein, operatively positioned in the housing means, for transferring the fluid from the inlet to the outlet, the flow control element further comprising a hollow member having flanges at each end thereof and being positioned in the cavity proximate the inlet at the first end of the body member and being held in position at the other end by a retainer;

a valve element having an inner and an outer surface, operatively positioned in the housing means, for interacting with the flow control element such that more or less area of the at least one cutout means is exposed to fluid from the inlet as a function of the pressure differential between the inlet and the outlet; and spring means, operatively connected to the valve element, for urging the valve element toward the outlet.

11. An apparatus for controlling fluid flow comprising:

housing means having a cavity and an inlet and an outlet operatively positioned therein;

at least one of a plurality of possible flow control elements having at least one cutout means formed therein, operatively positioned in the housing means, for transferring the fluid from the inlet to the outlet, the cutout means further comprising an open flow area, operatively positioned in the wall of the flow control element, exposed to inlet fluid such that a desired constant flow rate out of the outlet is maintained for any inlet/outlet pressure differential within a predetermined range;

a valve element having an inner and an outer surface, operatively positioned in the housing means, for interacting with the flow control element such that more or less area of the at least one cutout means is exposed to fluid from the inlet as a function of the pressure differential between the inlet and the outlet; and spring means, operatively connected to the valve element, for urging the valve element toward the outlet.

12. The apparatus of claim 11 wherein the open flow area further comprises:

at least two cutouts formed in opposing walls of the flow control element such that fluid from the inlet is transferred through the at least two cutouts to the outlet.

13. An apparatus for controlling fluid flow comprising:

housing means having a cavity and an inlet and an outlet operatively positioned therein;

at least one of a plurality of possible flow control elements having at least one cutout means formed therein, operatively positioned in the housing means, for transferring the fluid from the inlet to the outlet;

a valve element having an inner and an outer surface, operatively positioned in the housing means, for interacting with the flow control element such that more or less area of the at least one cutout means is exposed to fluid from the inlet as a function of the pressure differential between the inlet and the outlet;

spring means, operatively connected to the valve element, for urging the valve element toward the outlet;

a cage member operatively positioned within the cavity; and a plunger, operatively positioned in the cavity and operatively connected to the cage member, for providing fluid communications of the inlet fluid pressure to the inner and the outer surfaces of the valve element.

14. The apparatus of claim 13 wherein the plunger further comprises:

a first shoulder formed on the outer surface thereof extending from a ledge proximate the inlet to about the middle of the plunger; and a second shoulder formed on the outer surface thereof and extending from a second ledge contiguous with the first channel to a position proximate the other end thereof.

15. The apparatus of claim 14 wherein the plunger further comprises:

a bore, operatively formed therein from a first end to a location proximate the other end and including at least two apertures formed therein, the apertures being positioned at about ninety (90) degrees to the bore, for providing fluid communications with the two shoulders respectively.

16. An apparatus for controlling fluid flow comprising:

housing means having a cavity therein and an inlet and an outlet, the inlet and the outlet having about the same diameter, said inlet and outlet each having a longitudinal central axis and positioned such that said central axes coincide with one another;

a flow control element having cutout means formed therein, operatively positioned in the housing means, for transferring the fluid from the inlet to the outlet;

a valve element having an inner and an outer surface, operatively positioned in the housing means, for interacting with the flow control element such that more or less area of the cutout means is exposed to fluid from the inlet as a function of the pressure differential between the inlet and the outlet; and spring means, operatively positioned in the cavity, for urging the valve element toward the outlet such that the interaction of the cutout means and the valve element controls flow to about a constant flow rate, said spring means having a longitudinal central axis in the direction of its displacement, said axis of said spring means coinciding with said axes of said inlet and outlet.

17. The apparatus of claim 16 further comprising:
an outlet pressure sensing chamber in fluid communication with the outlet fluid pressure; and
an inlet pressure sensing chamber in fluid communication with the inlet fluid pressure.

18. The apparatus of claim 17 wherein the valve element further comprises:
means, operatively positioned in the valve element, for allowing both the outlet fluid pressure and the inlet fluid pressure to act on both the inner surface of the valve element and the outer surface of the valve element.

19. The apparatus of claim 17 wherein the cage member further comprises:
fluid communications means for communicating the outlet pressure from an outlet flow chamber to an outlet pressure sensing chamber.

20. The apparatus of claim 16 further comprising:
a cage member, operatively positioned within the cavity and operatively connected to a plunger.

21. An apparatus for controlling fluid flow comprising:
housing means having a cavity therein and an inlet and an outlet, the inlet and the outlet having about the same diameter, the housing means further comprising a body member including the inlet, the housing means further comprising a fitting member including the outlet;
a flow control element having cutout means formed therein, operatively positioned in the housing means, for transferring the fluid from the inlet to the outlet;
a valve element having an inner and an outer surface, operatively positioned in the housing means, for interacting with the flow control element such that more or less area of the cutout means is exposed to fluid from the inlet as a function of the pressure differential between the inlet and the outlet; and
spring means, operatively positioned in the cavity, for urging the valve element toward the outlet such that the interaction of the cutout means and the valve element controls flow to about a constant flow rate.

22. An apparatus for controlling fluid flow comprising:
housing means having a cavity therein and an inlet and an outlet, the inlet and the outlet having about the same diameter, the housing means further comprising a body member including the inlet, the housing means further comprising a fitting member including the outlet, the body member further comprising a first open end portion for connection with an inlet pipe of a fluid system, the body member further comprising a second open end portion for cooperation with the fitting member, the first open end portion having an inlet about the same diameter as a fluid system inlet pipe, the second open end portion diameter being larger than the diameter of the first open end portion;
a flow control element having cutout means formed therein, operatively positioned in the housing means, for transferring the fluid from the inlet to the outlet;
a valve element having an inner and an outer surface, operatively positioned in the housing means, for interacting with the flow control element such that more or less area of the cutout means is exposed to fluid from the inlet as a function of the pressure differential between the inlet and the outlet;
spring means, operatively positioned in the cavity, for urging the valve element toward the outlet such that the interaction of the cutout means and the valve element controls flow to about a constant flow rate;
an outlet pressure sensing chamber in fluid communication with the outlet fluid pressure; and
an inlet pressure sensing chamber in fluid communication with the inlet fluid pressure.

23. An apparatus for controlling fluid flow comprising:
housing means having a cavity therein and an inlet and an outlet, the inlet and the outlet having about the same diameter, the housing means further comprising a body member including the inlet, the housing means further comprising a fitting member including the outlet, the fitting member further comprising a first open end portion for cooperating with the body member and a second open end portion for connecting to a fluid system outlet pipe, the first end portion being larger in cross sectional area than the second open end portion, the inside surface of the fitting being contoured such that the diameter of the cavity formed by the connection of the housing with the fitting has a larger diameter than either connecting inlet or outlet fluid system pipe and the cavity diameter tapers to about the diameter of the outlet pipe;
a flow control element having cutout means formed therein, operatively positioned in the housing means, for transferring the fluid from the inlet to the outlet;
a valve element having an inner and an outer surface, operatively positioned in the housing means, for interacting with the flow control element such that more or less area of the cutout means is exposed to fluid from the inlet as a function of the pressure differential between the inlet and the outlet;
spring means, operatively positioned in the cavity, for urging the valve element toward the outlet such that the interaction of the cutout means and the valve element controls flow to about a constant flow rate;
an outlet pressure sensing chamber in fluid communication with the outlet fluid pressure; and
an inlet pressure sensing chamber in fluid communication with the inlet fluid pressure.

24. An apparatus for controlling fluid flow comprising:
housing means having a cavity therein and an inlet and an outlet, the inlet and the outlet having about the same diameter;
a flow control element having cutout means formed therein, operatively positioned in the housing means, for transferring the fluid from the inlet to the outlet, the flow control element further comprising a hollow member having flanges at each end thereof and being positioned in the cavity proximate the inlet at the first end of the body member and being held in position by a retainer;
a valve element having an inner and an outer surface, operatively positioned in the housing means, for interacting with the flow control element such that more or less area of the cutout means is exposed to fluid from the inlet as a function of the pressure differential between the inlet and the outlet; and
spring means, operatively positioned in the cavity, for urging the valve element toward the outlet such that the interaction of the cutout means and the valve element controls flow to about a constant flow rate.

25. An apparatus for controlling fluid flow comprising:
housing means having a cavity therein and an inlet and an outlet, the inlet and the outlet having about the same diameter;
a flow control element having cutout means formed therein, operatively positioned in the housing means, for transferring the fluid from the inlet to the outlet, the cutout means further comprising an open area, operatively positioned in the wall of the flow control element, the open area being exposed to inlet fluid such that the desired constant flow rate out of the outlet is maintained for any inlet/outlet pressure differential within a predetermined inlet/outlet pressure differential range;

a valve element having an inner and an outer surface, operatively positioned in the housing means, for interacting with the flow control element such that more or less area of the cutout means is exposed to fluid from the inlet as a function of the pressure differential between the inlet and the outlet; and spring means, operatively positioned in the cavity, for urging the valve element toward the outlet such that the interaction of the cutout means and the valve element controls flow to about a constant flow rate.

26. The apparatus of claim 25 wherein the open area further comprises:

at least two cutouts formed in the flow control element such that fluid from the inlet is transferred through the cutouts to the outlet.

27. An apparatus for controlling fluid flow comprising:

housing means having a cavity therein and an inlet and an outlet, the inlet and the outlet having about the same diameter;

a flow control element having cutout means formed therein, operatively positioned in the housing means, for transferring the fluid from the inlet to the outlet;

a valve element having an inner and an outer surface, operatively positioned in the housing means, for interacting with the flow control element such that more or less area of the cutout means is exposed to fluid from the inlet as a function of the pressure differential between the inlet and the outlet, the valve element further comprising means, operatively positioned in the valve element, for allowing both the outlet fluid pressure and the inlet fluid pressure to act on both the inner surface of the valve element and the outer surface of the valve element;

spring means, operatively positioned in the cavity, for urging the valve element toward the outlet such that the interaction of the cutout means and the valve element controls flow to about a constant flow rate;

an outlet pressure sensing chamber in fluid communication with the outlet fluid pressure;

an inlet pressure sensing chamber in fluid communication with the inlet fluid pressure; and a plunger, operatively positioned in the cavity and operatively connected to a cage, for providing fluid communications of the inlet fluid pressure to said inlet pressure sensing chamber.

28. The apparatus of claim 27 wherein the plunger further comprises:

a first shoulder formed on the outer surface thereof, the first shoulder extending from a ledge proximate the inlet to about the middle of the plunger; and a second shoulder formed therein extending from a second ledge contiguous with the first channel to a position proximate the other end of the plunger.

29. The apparatus of claim 28 wherein the plunger further comprises:

a bore, operatively formed from a first end of the plunger to a location proximate the other end of the plunger and including at least two apertures formed therein, the apertures being positioned at about ninety (90°) degrees to the bore, for providing fluid communications with the two shoulders, respectively.

30. The apparatus of claim 29 wherein the plunger further comprises:

means for stopping the valve element at a predetermined maximum stroke.

31. A method for maintaining a constant flow rate in a fluid system, the method comprising the steps of:

providing a flow control device having an inlet and an outlet, said inlet and outlet each having a longitudinal central axis and positioned such that said central axes coincide with one another, a cavity and including a flow control element having at least one cutout positioned therein, the flow control element being operatively positioned in the cavity between the inlet and the outlet, a valve element, operatively positioned relative to the flow control element, and a spring means for urging the valve element toward the outlet, said spring means being operatively positioned in the cavity and having a longitudinal central axis in the direction of displacement of said spring means, said axis of said spring means coinciding with said axes of said inlet and outlet;

sensing the pressure difference between the inlet and the outlet; and positioning the valve element at any one of a plurality of possible positions relative to the at least one cutout such that the relative amount of the at least one cutout exposed to fluid from the inlet will maintain the fluid flow rate exiting the outlet at a constant flow rate for a predetermined range of inlet/outlet pressure differentials.

32. A method for producing a flow control element having at least one cutout for use in a constant flow rate flow control device having a valve element, a cavity and variable inlet pressures and variable outlet pressures, the method comprising the steps of:

determining an inlet pressure range;

determining an outlet pressure range;

determining the desired flow rate;

determining the range of the pressure differential between the inlet and the outlet;

calculating the flow rate using the equation:

$$Q = C_d * A * (2 * g_c * (P_{inlet} - P_{outlet})/\rho)^{1/2}$$

where:
Q=Flow Rate
$C_d$=Discharge Coefficient
A=Flow Area
$g_c$=Gravitational Constant
$P_{inlet}$=Inlet Pressure
$P_{outlet}$=Outlet Pressure
$\rho$=Fluid Density for any pressure differential within the predetermined range.

33. A self-regulating control valve, comprising: a valve body defining a chamber having an inlet port and an outlet port, flow control structure interposed between said ports, said structure comprising a fixed sleeve and a valve-member sleeve slidably guided by and within said fixed sleeve, said valve member sleeve having internal communication with said inlet port, said fixed sleeve having an elongate radially open orifice that is longitudinally precharacterized as to arcuate extent, whereby guided longitudinal positioning of said valve-member sleeve may determine the effective size of said orifice, said precharacterized fixed sleeve having external communication with said outlet port, and means, responsive to instantaneous differential pressure between inlet and outlet fluid pressures, for determining instantaneous longitudinal position of said valve-member sleeve.

34. The control valve of claim 33, in which the chamber of said valve body is divided by said fixed sleeve into an inlet-chamber portion within said fixed sleeve and an outlet-chamber portion external to said fixed sleeve, and wherein the effective outlet-chamber volume is substantially greater than the effective inlet-chamber volume.

35. The control valve of claim 33, in which said fixed sleeve includes a plurality of like radially open orifices, in angularly spaced distribution.

36. The control valve of claim 33, in which said precharacterized orifice extends between opposite longitudinal ends and has a maximum angular extent at one of said longitudinal ends and a minimum angular extent at the other of its longitudinal ends.

37. The control valve of claim 36, in which said precharacterized orifice includes at said other longitudinal end an angularly extending slot formation in communication with said precharacterized orifice.

38. The control valve of claim 36, in which said precharacterized orifice terminates at said other longitudinal end, and in which said fixed sleeve includes an angularly extending slot formation near but at longitudinal offset beyond said other longitudinal end of said precharacterized orifice.

39. The control valve of claim 36, in which said precharacterized orifice comprises a longitudinally distributed plurality of precharacterizations, wherein a first precharacterization reduces from said maximum angular extent to a lesser angular extent at a location intermediate said ends, and wherein said intermediate location is the location of maximum angular extent of a second longitudinally extending precharacterization of said orifice.

40. The control valve of claim 33, in which said sleeves are annular about a common central axis, said inlet port having a cylindrical bore on said axis, and the bore of said fixed sleeve matching that of said inlet port.

41. The control valve of claim 40, in which said fixed sleeve divides said chamber into an inlet chamber within said fixed sleeve and an outlet chamber external to said fixed sleeve, the effective outlet-chamber volume being substantially greater than the effective inlet-chamber volume, said outlet-chamber volume being of annular configuration about said axis and being contoured with gradual sectional reduction to convergence to said outlet port.

42. A self-regulating valve for controlling flow of a pressure fluid, comprising: a generally cylindrically annular valve body extending longitudinally about a central axis and having spaced upstream and downstream end-closure formations with inlet and outlet ports on said axis and at the respective end-closure formations, flow-control structure interposed between said ports, said structure comprising a fixed cylindrical sleeve concentric with said axis and fitted at its upstream end to the inlet end-closure formation in communication with said inlet port, said fixed sleeve having an elongate open orifice that is longitudinally precharacterized as to arcuate extent, whereby guided longitudinal positioning of said valve-member sleeve may determine the effective size of said orifice, a valve member sleeve slidably guided by and within said fixed sleeve for longitudinal displaceability for the substantial length of said fixed sleeve, said valve-member sleeve having radially inward and radially outward flange formations at its downstream end, internal cage structure within said chamber and supported by angularly spaced radial struts in radially spaced relation to said chamber, said cage structure having a cylindrical bore which is open in the upstream direction and which provides further guided support for the radially outward flange formation of said valve-member sleeve, said cage structure being closed at its downstream end, a central stem connected at its downstream end to the closed end of said cage structure, said stem having an elongate bore that is open at the upstream end of the stem, said stem having one or more radial passages for communication of upstream fluid pressure to the closed end region within said cage bore, said stem having a first shoulder in lap of a radially outer region of the radially inward flange formation of said valve-member sleeve, a preloading spring seated between said first shoulder of said stem and the radially inward flange formation of said valve-member sleeve for preloading said valve-member sleeve in opposition to upstream displacement, and stop means carried by said stem to limit valve-member sleeve displacement beyond a predetermined limit of valve-closing action, upon stop engagement with the flange of said valve-member sleeve.

* * * * *